United States Patent [19]

Daintrey et al.

[11] Patent Number: 4,694,739
[45] Date of Patent: Sep. 22, 1987

[54] APPARATUS FOR BEVERAGE BREWING

[75] Inventors: Joseph W. Daintrey, Royston; Peter Thomson, Cambridge, both of England

[73] Assignee: Sankey Vending Limited, Bilston, England

[21] Appl. No.: 852,249
[22] PCT Filed: Aug. 21, 1985
[86] PCT No.: PCT/GB85/00375
  § 371 Date: Apr. 3, 1986
  § 102(e) Date: Apr. 3, 1986
[87] PCT Pub. No.: WO86/01388
  PCT Pub. Date: Mar. 13, 1986

[30] Foreign Application Priority Data

Aug. 25, 1984 [GB] United Kingdom ............... 8421674

[51] Int. Cl.$^4$ ............................................. A47J 31/00
[52] U.S. Cl. ................................. 99/289 R; 99/302 P
[58] Field of Search ................. 99/287, 289 R, 289 T, 99/300, 302 P, 302 R; 426/433

[56] References Cited

U.S. PATENT DOCUMENTS 3,019,719 2/1962 Parraga ................................ 99/287
3,565,641 2/1971 King .................................... 99/287

Primary Examiner—Robert W. Jenkins
Attorney, Agent, or Firm—Marshall, O'Toole, Gerstein, Murray & Bicknell

[57] ABSTRACT

Apparatus for making an infusion, e.g. tea or coffee, and having a piston and cylinder for blowing air through the infusion and then drawing it through a filter base, the cylinder having a flange which is slidably received between arms of a support, the flange having in its opposed side faces grooves which receive inward facing flanges on the arms and there being a disconnectable connection between the piston connecting rod and its operating crank so that, when said connection is disconnected, the cylinder can be mounted on and removed from the apparatus.

4 Claims, 1 Drawing Figure

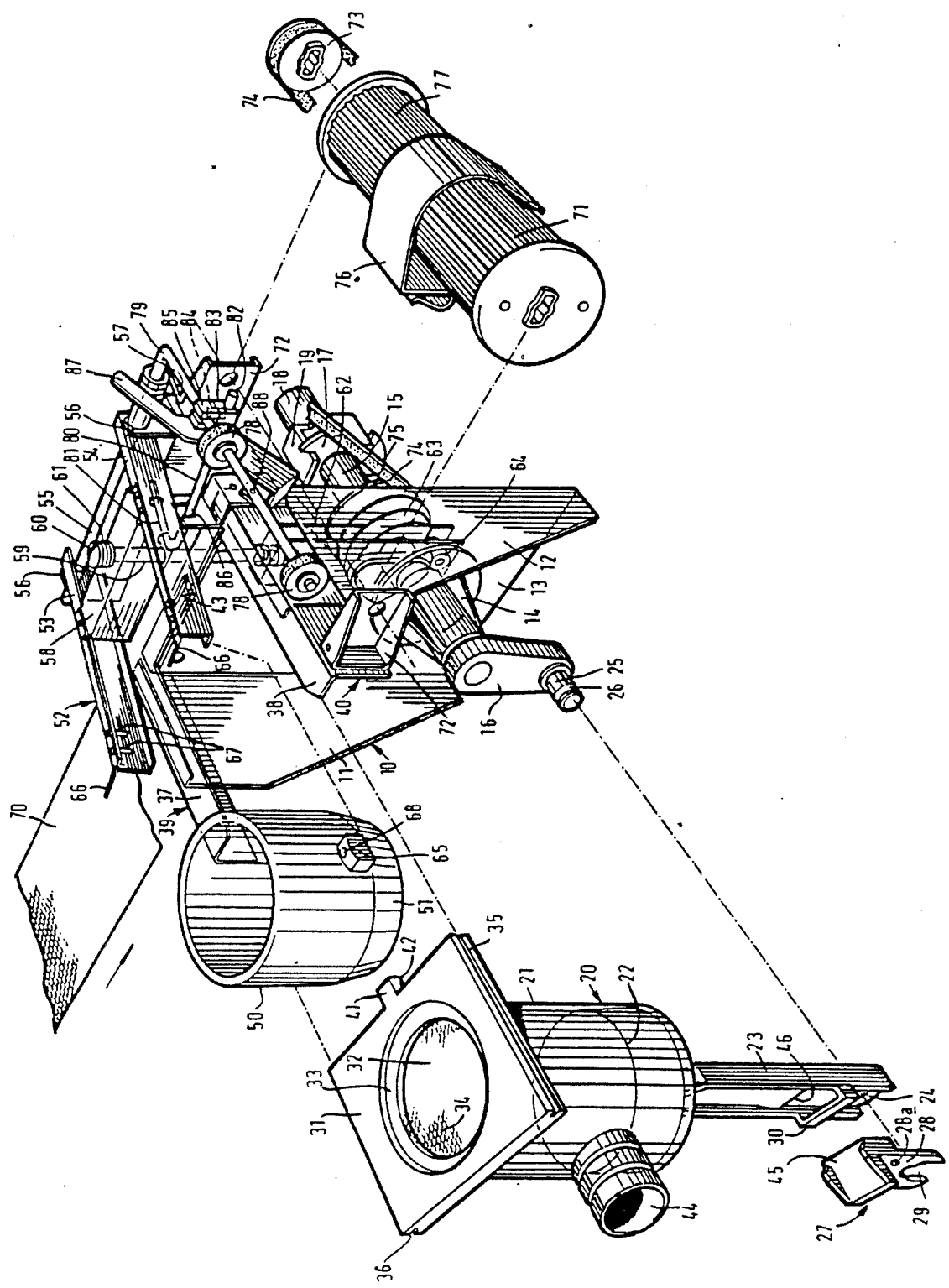

APPARATUS FOR BEVERAGE BREWING

This invention relates to apparatus, hereinafter referred to as being of the type specified, for producing, during a cycle, an infusion from a liquid and an infusible ingredient, e.g. tea or coffee, and which comprises the following:

1. a container for receiving the ingredient and liquid and arranged to have a base which is permeable to air and liquid but substantially impermeable to the ingredient, the container being movable between an operative position in which it can be sealed to the base and an inoperative position in which it is spaced from the base;
2. a piston and cylinder assembly under the container arranged so that the open top of the cylinder communicates with the base and the piston is operable when the container is in its operative position:
   (a) to pass air upwardly through the base in to the container and
   (b) subsequently to reduce the pressure beneath the base to assist an infusion in the container to pass through said base into the cylinder;
3. an outlet in the cylinder through which the infusion entering the cylinder via the base can be delivered; and
4. operating means to cycle the apparatus by reciprocating the piston and moving the container between its operative and inoperative positions.

The base may be constituted by a filter medium, e.g. paper, and/or by a rigid mesh. When the container is in its inoperative position the base can be cleared of spent ingredient. If the base is a mesh only this can be effected by scraping. If the base is, or includes, a filter medium the latter can be in the form of a continuous strip which is advanced intermittently to remove the length of paper carrying the spent ingredient and to bring a fresh length of medium into position under the container for the next operation of the apparatus.

In the operation of such apparatus, as shown for example in U.S. Pat. No. 3,565,641 the ingredient, e.g. coffee, and the liquid, e.g. hot water, are delivered into the container from above when the piston is between its dead-centre positions and in which the outlet is isolated from the base by the piston. Infusion commences and the piston is then moved upwardly to pass air from the cylinder through the base and through the mixture to agitate it to assist infusion. The piston then moves downwardly to reduce the pressure in the cylinder and to draw the infusion through the base into the cylinder, leaving the coffee grounds on the base. When the piston approaches its bottom dead centre position it opens the outlet so that the infusion can be delivered from the cylinder. The container then moves to its inoperative position, the spent ingredient is removed from the base and the container returns to its operative position and the apparatus is ready for the next cycle.

According to the invention we provide apparatus of the type specified wherein the operating means comprises a connecting rod joining the piston to a rotatable crank and a detachable connection between said rod and the crank; the apparatus including a support, a pair of arms on the support to receive the cylinder therebetween, a flange on the cylinder and mutually interengageable surfaces on each arm and on the flange, such surfaces extending generally perpendicular to the longitudinal axis of the cylinder; the piston and cylinder assembly being mountable and demountable from the support when said connection is detached by sliding the flange between the arms with said surfaces engaged.

In this arrangement, therefore, it is a simple matter to remove and replace the piston and cylinder assembly when necessary for cleaning or for replacement or repair and such an arrangement is important in apparatus of this type when used in a vending machine which is in continual operation.

The surfaces on the flange on the cylinder are formed by groove walls into which fit flanges on the arms which also provide such surfaces.

A resilient catch may be provided to hold the cylinder in its mounted position on the support. The catch may be provided by a formation on the flange of the cylinder arranged to engage a detent on the support.

The invention will now be described in detail by way of example with reference to the accompanying drawing which is an exploded perspective view of an embodiment of the invention.

Referring to the drawing, the apparatus comprises a support 10 having arms 11 and 12 and a backplate 13. The backplate carries a bearing assembly 14 in which is rotatable a driving shaft 15 carrying at one end a crank 16 and at the other end a notched coupling plate 17 whereby it can be rotated by the shaft 18 of an electric motor, not shown. The shaft 18 carries a coupling 19 having projections to engage the notches of the plate 17.

A piston and cylinder assembly is indicated generally at 20 and comprises a cylinder 21 within which is reciprocal a piston 22 by means of a connecting rod 23. At its lower end the connecting rod has an aperture 24 to fit onto a crank pin 25 on the crank 16. The crank pin 25 has a peripheral groove 26 and the connecting rod is retained in position on the crank pin by means of a detachable connection 27. This comprises a plate 28 having a partial key hole slot 29 in the lower edge thereof. The larger part of the slot 29 is arranged to fit the crank pin 25 and the smaller part of the slot is arranged to fit the groove 26. The plate 28 is slidable within a loop 30 on the connecting rod and after initial assembly is retained in the loop.

At its upper end the cylinder 21 is provided with a rectangular flange 31. The flange is provided with a central aperture 32 which communicates with the open top of the cylinder 21. Surrounding the aperture 32 is a seal 33 received in a recess in the upper surface of the flange. The seal embraces the edge of a fine mesh 34 which thus covers the aperture 32.

Opposite sides of the flange 31 are provided with grooves 35 and 36 and these grooves are arranged to engage with flanges 37 and 38 respectively at the tops of the arms 11 and 12. The flanges 37 and 38 are provided by angle members 39 and 40 which are secured to the upper ends of the arms.

The upper and lower surfaces of the flanges 37 and 38 and the walls of the grooves 35 and 36 provide mutually interengageable surfaces and the piston and cylinder assembly can be mounted on and demounted from the support by engaging and disengaging the flanges 37 and 38 in the grooves 35 and 36. A resilient catch is provided for holding the piston and cylinder assembly in its mounted position and this comprises a projection 41 on the flange 31 having a ridge 42 on its lower surface which can engage with a detent 43 at the top of the back plate 13. The cylinder is provided with an outlet spout 44 secured to the cylinder in alignment with an outlet aperture in the wall thereof.

With the connection 27 disengaged, as shown, the piston and cylinder assembly can be mounted on and demounted from the support merely by sliding the piston and cylinder assembly into and out of position by engaging the flanges 37 and 38 in the grooves 35 and 36. When the piston and cylinder assembly is mounted in position the aperture 24 in the connecting rod will be engaged in the crank pin 25. To mount the connecting rod on the crank pin the detachable connection 27 will have been located so that the larger part of the slot 29 is in alignment with the pin 25. When the piston and cylinder assembly is in position, the connection 27 will be moved downwardly so that the smaller part of the slot 29 engages in the peripheral groove 26 in the crank pin thus holding the connecting rod in position.

The upward extent of movement of the connection 27 is limited by engagement of a ledge 45 with an edge 46 on a web of the connecting rod. A pip 28a is formed on the outer face of the plate 28 and can be moved past the loop 30. When the pip 28a is above the loop it releasably holds the connection in a position to engage the pin 25 and when the pip is below the loop 30 it holds the connection with the smaller part of the slot 29 in the groove 26. Rotation of the shaft 15 will reciprocate the piston 22 in the cylinder 21.

A generally cylindrical container 50 is provided in which the infusion is made as will hereinafter be described. The container has a bevelled lower edge 51, the lower edge surface being arranged to engage with the seal 33. The container is mounted detachably in an H frame indicated generally at 52. The H frame comprises two side limbs 53 and 54 and is pivotted at one end of the limbs 53 and 54 to the support by means of a pivot pin 55 received in apertures in the limbs 53 and 54 and in lugs 56 of the support. A spring 57 is arranged to urge the frame 52 upwardly to the position shown as will be described below.

The H frame has a cross member 58 through which passes a connecting rod 59 having a head 60. A spring 61 is engaged between the head and the cross member 58. The lower end of the connecting rod 59 is secured to a yoke 62 which can be moved downwardly against the action of spring 57 by a cam 63 engaging a roller 64 on the yoke. The cam is mounted on the shaft 15 so that rotation of the shaft 15 reciprocates the connecting rod 59 and moves the H frame 52 downwardly to move the container 50 to an operative position as will hereinafter be described. The container 50 is mounted on the H frame 52 by two lugs, one of which is shown at 65. These lugs fit within the channel section side limbs 53 and 54. Attached to each side limb is a spring 66 carrying projections 67 which pass through apertures, not shown, in the upper flanges of the side members.

The container is mounted by pushing the lugs 65 into the side members with the springs 66 raised and then allowing the springs to return to the positions shown so that one of the projections 67 enters an aperture 68 in each lug 65.

The filter medium used in the apparatus is paper in strip form and is indicated at 70. It is pulled across the flange 31 by a drive roller 71 which is mounted for rotation between lugs 72 mounted on the angle member 40. The drive roller is driven by a pulley 73 driven by a belt 74 from a pulley 75 on the shaft 15. A doctor blade 76 is provided round the roller 71 to prevent the wet filter medium sticking thereto as will hereinafter be described. The surface of the drive roller 71 is ridged as shown at 77.

Co-operating with the drive roller is a pair of pinch rollers 78 which are mounted on an axle 79 which is in one piece with the pivot pin 55.

An L shaped connection 80 has one of its limbs 81 received in apertures in the cross member 58 of the H frame 52. The other limb 82 is received in a block 83 which is pivotted on a pin 84 to another block 85 which embraces the axle 79. The limb 80 engages a fulcrum 86 formed on a bracket on the support.

The arrangement is such that when the H frame is in the down position, and therefore the container 50 is in its operative position, the pinch rollers are in an inoperative position and do not grip the filter medium against the drive roller 71.

When, however, as shown the H frame is in its raised position, and therefore the container in its inoperative position, the pinch rollers are in their operative position and grip the filter medium against the drive roller 71 which is being rotated via the belt 74 and which therefore pulls a fresh strip of filter medium into position as will hereinafter be described.

The spring 57 acts on the axle 79 to urge it downwardly and this, through the connection 80, to urge the H frame 52 upwardly to it inoperative position.

A latch 87 is provided to move the pinch rollers 78 to their inoperative position when the H frame is in its upper position and therefore the container 50 is in its inoperative position. This is a desirable requirement to allow the feeding of a new length of filter paper into the apparatus.

Normally, when the container is in its operative position the pinch rollers are in their inoperative position and therefore it is not possible to feed a fresh strip of paper because the container will be in engagement with the seal 33. When the container is in its inoperative position, however, the pinch rollers 78 will normally be gripping the filter paper against the drive roll 71. By being able manually to lift the pinch rollers, therefore, when the container is in its inoperative position, feeding in a new strip of filter medium is facilitated.

The latch 87 is pivotted to the support at 88 and it has a notch, not shown, to engage the limb 82 of the connection 80. This engagement changes the fulcrum point of the connection from the position 86 to a position adjacent to the blocks 83 and 84 and therefore has the effect of lifting the axle 79 and moving the pinch rollers to their inoperative positions. This enables a fresh length of filter medium to be incorporated in the apparatus while both the container 50 and the pinch rollers 78 are in their inoperative positions.

Operation of the apparatus is as follows: the apparatus is set up so that the piston and cylinder assembly is in its mounted position between the arms 39 and 40, the filter medium extends across the top of the flange 31 and around the drive roller 71 and the container 50 is received in the H frame 52. At the beginning of a cycle, the container will be in its operative position, i.e. the lower edge thereof will engage the seal 33 via the strip of filter medium. The pinch rollers 78 will be in their inoperative position and the filter paper will be in engagement with the roller 71. Hot liquid and an infusible ingredient such as coffee are then fed into the container 50 and the shaft 15 rotates. The piston 22 moves upwardly in the cylinder to bubble air through the infusion in the container and then moves downwardly to reduce the pressure under the filter medium and to induce flow of the infusion into the cylinder 21. As the piston approaches its bottom dead centre position it allows the infusion to leave the cylinder through the outlet spout 44. As rotation of the shaft 15 continues the cam 63 will allow the H frame 52 to move to its upper or inoperative position and as a result the connection 80 will allow the pinch rollers to be moved downwardly by the spring 57 to grip the filter medium on the drive roller 71. The drive roller 71 will be rotated to draw a fresh length of filter medium under the container 50 which is in its inoperative position and the filter paper with the spent coffee or ingredient on it will be moved to the right of the drawing and wet filter medium will be prevented from sticking to the drive roller 71 by the doctor blade 76. The cycle will be completed by the container 50 being moved back to its operative position ready for the next cycle and the pinch rollers 78 being moved to their inoperative position.

As has previously been described, when it is required to fit a new length of a filter medium the apparatus is adjusted so that the container 50 is in its inoperative position; the Latch 87 is then moved so as to engage the connection 80 to change the fulcrum point thereof and thus to lift the pinch rollers 78. It is now therefore easy to introduce a new length of filter medium under the container 50 and under the pinch rollers 78 and over the drive roll 71 ready for the next cycle. The latch is then disengaged so that the pinch rollers are free and engage the drive roller. The apparatus will then be adjusted in readiness for the next cycle by rotating the shaft to bring the container 50 to its operative position and the pinch rollers 78 to their inoperative positions.

The latch 87 could be arranged merely to lift the connection 80 rather than change the fulcrum point so as to lift the pinch rollers 78.

It will be seen that the invention provides apparatus of the type specified in which, in the embodiment described, the piston and cylinder assembly can easily be mounted on and dismounted from the apparatus for cleaning or replacement, there is a simple mechanical arrangement for the pinch rollers and H frame which share a single member as their axle and pivot pin respectively and there is means by which the pinch rollers can be lifted with a container in an inoperative position to enable the feeding of a new strip of filter medium into the apparatus.

We claim:

1. Apparatus for producing, during a cycle, an infusion from a liquid and an infusible ingredient, and comprising: a container for receiving the ingredient and liquid; a base of the container which is permeable to air and liquid but substantially impermeable to the ingredient; means to move the container between an operative position in which it is sealed to the base and an inoperative positon in which it is spaced from the base; a piston and cylinder assembly under the container; the cyliner having an open top which communicates with the base; a support; a pair of arms on the support to receive the cylinder therebetween; a flange on the cylinder; mutually interengageable surfaces on each arm and the flange, such surfaces extending generally perpendicular to the longitudinal axis of the cylinder; means for reciprocating the piston in the cylinder when the container is in its operative position; said reciprocating means comprising: a connecting rod between the piston, a rotatable crank and a detachable connection between said rod and the crank; the piston and cylinder assembly being mountable on and demountable from the support when said connection is detached by sliding the flange between the arms with said surfaces engaged; an outlet in the cylinder through which the infusion entering the cylinder via the base can be delivered; and operating means to cycle the apparatus by reciprocating the piston and moving the container between its operative and inoperative positions.

2. Apparatus according to claim 1, wherein the surfaces on the flange on the cylinder are formed by the walls of grooves into which slidably fit flanges on the arms which also provide such surfaces.

3. Apparatus according to claim 1 wherein a resilient catch is provided to hold the cylinder in its mounted position on the support.

4. Apparatus according to claim 3 wherein the catch is provided by a formation on the flange on the cylinder arranged to engage a detent on the support.

* * * * *

UNITED STATES PATENT AND TRADEMARK OFFICE
CERTIFICATE OF CORRECTION

PATENT NO. : 4,694,739

DATED : September 22, 1987

INVENTOR(S) : JOSEPH W. DAINTREY ET AL

It is certified that error appears in the above-identified patent and that said Letters Patent is hereby corrected as shown below:

Column 6, line 21, change "piston, a rotatable" to
-- piston and a rotatable --

Signed and Sealed this

Twenty-second Day of March, 1988

Attest:

DONALD J. QUIGG

*Attesting Officer*      *Commissioner of Patents and Trademarks*